Sept. 12, 1967 K. S. STULL, JR 3,341,786
INTERMEDIATE FREQUENCY PREAMPLIFIER CIRCUIT
Filed Feb. 17, 1964
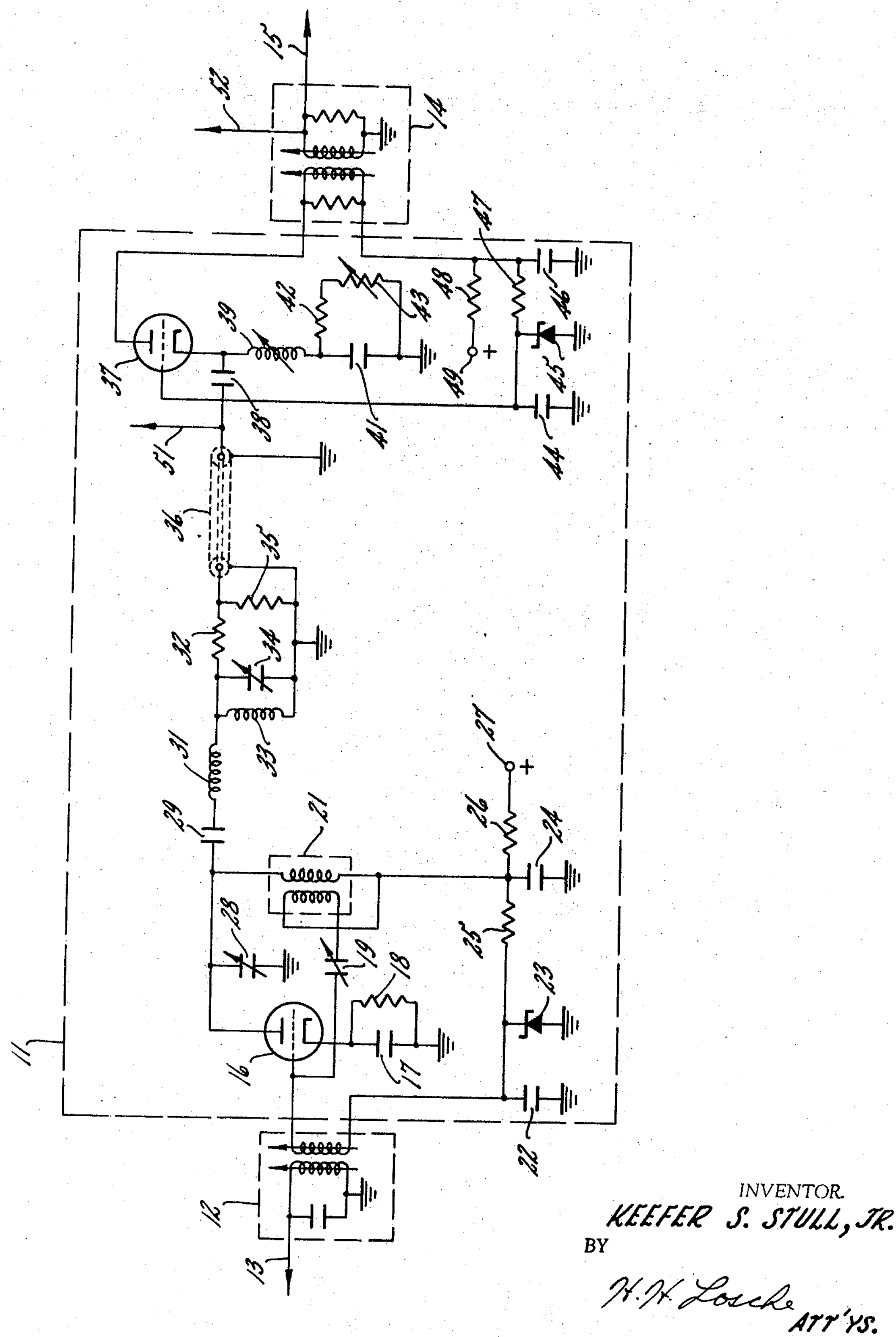
INVENTOR.
KEEFER S. STULL, JR.
BY
H. H. Losche
ATT'YS.

3,341,786

INTERMEDIATE FREQUENCY PREAMPLIFIER CIRCUIT

Keefer S. Stull, Jr., Baltimore, Md., assignor, by mesne assignments, to the United States of America as represented by the Secretary of the Navy Filed Feb. 17, 1964, Ser. No. 345,544
3 Claims. (Cl. 330—158)

The present invention is generally related to electronic amplifier circuitry and more particularly to an intermediate frequency (IF) preamplifier circuit for utilization between the microwave mixer stage and the main IF amplifier (postamplifier) of a radar receiver.

When a logarithmic IF amplifier is employed in a radar receiver, the greatest possible dynamic range (i.e., the range of signal levels above the thermal noise level for which a receiver will provide a normal useable output signal) is usually required. The minimum useful signal is determined by the noise level, typically on the order of −100 dbm (decibels below one milliwatt), and the maximum useful signal is determined by the severe saturation level of the preceding crystal mixer stage (on the order of zero dbm). When a successive detection type of logarithmic amplifier is utilized and it is desirable to obtain logarithmic operation over a wide decibel range (for example, 100 db), it is necessary to obtain a sample, or "pick-off," signal from the input path of each stage of IF amplification, including the first stage following the mixer, i.e., the preamplifier stage.

In radar receivers of the prior art, the IF amplifier is frequently divided into two units, an IF preamplifier and the main IF amplifier (postamplifier), in order to enable the input, or preamplifier, stages thereof to be physically located on or near the separate chassis of the preceding mixer stage. The preamplifier stages are then coupled to the remote postamplifier by connecting cables. This arrangement is usually satisfactory except where a successive detection type of logarithmic IF amplifier is utilized and it is necessary to obtain a pick-off signal from each of the stages thereof, including the remotely located preamplifier stage. The circuitry of the prior art has the entire preamplifier stage located at or near the mixer stage; thus, if this prior art arrangement were utilized and no pick-off signal were obtained from that remote stage, the radar receiver logarithmic range would be decreased by the amount of the gain of that stage (approximately 15 to 20 db). On the other hand, if a pick-off signal is obtained from the remotely located preamplifier stage, the noise figure is usually increased due to the frequencies involved and the introduction of the lengthy conductor required to convey that signal to the vicinity of the postamplifier chassis for utilization, in conjunction with the other pick-off signals obtained from successive stages of the postamplifier, in subsequent circuitry.

The present invention embodies a preamplifier circuit eliminating these disadvantages of the prior art by a novel arrangement of circuitry permitting one section of the preamplfiier circuit to be remotely located on or near the chassis of the microwave mixer stage, and yet obtaining the maximum logarithmic dynamic range possible without deterioration of the noise figure due to the provision of a pick-off signal from the other section of the preamplifier which may now be physically located on or near the chassis of the postamplifier.

An object of the present invention is the provision of a preamplifier circuit for use in a radar receiver.

Another object is to provide a preamplifier circuit for use in a radar receiver, which may be constructed in two sections in order that one section may be located remotely with respect to the other without appreciable deterioration of the noise figure.

A further object of the invention is the provision of a preamplifier circuit, for use in a radar receiver, having physically separable sections coupled by coaxial cable to enable one section to be located near the mixer stage and the other section to be located near the postamplifier stage to allow a pick-off signal to be taken therefrom in conjunction with similar signals taken from the stages of the postamplifier.

Other objects and many of the attendant advantages of this invention will be readily appreciated as the same becomes better understood by reference to the following detailed description of a preferred embodiment of the invention as schematically illustrated in the accompanying figure of drawing.

Referring now to the figure of drawing, there is shown a specific embodiment of the invention within the large dotted-line block 11. The circuitry of block 12 couples the invention, via conductor 13, to the microwave mixer stage of a radar receiver and the circuitry of block 14 couples the invention, via conductor 15, to the input stage of a logarithmic IF postamplifier of a radar receiver; the mixer and postamplifier stages and the coupling circuitry represented by blocks 12 and 14 are not considered to be a part of this invention, and will not be discussed in further detail at this time. Input triode tube 16 has its cathode electrode coupled via the parallel combination of capacitance 17 and resistance 18 to ground potential, and its grid electrode coupled to an end terminal of the secondary winding of the coupling transformer of block 12 and via a variable capacitance 19 to an end terminal of a first winding of a bifilar wound coil 21 which has the other end terminal thereof cross coupled in common with the opposite terminal of the other winding of that coil. The other end terminal of the secondary winding of the coupling transformer of block 12 is coupled via the parallel combination of capacitance 22 and Zener diode 23 to ground potential and via resistance 25 to a common junction point which is coupled directly to the common junction of the bifilar windings of coil 21, via capacitance 24 to ground potential, and via resistance 26 to a source of positive direct current potential 27. The anode electrode of tube 16 is coupled to one terminal of a variable capacitance 28 which has its other terminal grounded, is also coupled to the remaining terminal of coil 21, and is further coupled via capacitance 29, inductance 31, and resistance 32 to the center conductor of coaxial cable 36 whose length will be determined by the amount of physical separation desired between the two sections of the invention. An inductance 33 and a variable capacitance 34 are coupled in parallel between the junction of inductance 31 and resistance 32, and ground potential. Resistance 35 is coupled between the junction of resistance 32 and the center conductor of cable 36, and ground potential. The outer conductor of coaxial cable 36 is coupled to ground potential at each end. Triode tube 37 has its cathode electrode coupled via capacitance 38 to the center conductor of cable 36, and via variable inductance 39 and the parallel combination of capacitance 41 with resistance 42 and variable resistance 43, to ground potential. The grid electrode of tube 37 is coupled via the parallel combination of capacitance 44 and Zener diode 45 to ground potential. The anode electrode of tube 37 is coupled via the primary winding of the coupling transformer in block 14, through resistance 48 to a source of positive direct current potential 49, through resistance 47 to the grid electrode of tube 37, and through capacitance 46 to ground potential. A conductor 51 has one of its ends coupled to a point between the cathode electrode of tube 37 and the center conductor of cable 36, to provide the necessary first pick-off signal for use in subsequent circuitry, and a conductor 52 is coupled to the secondary winding of the transformer in block 14 to provide the second pick-off signal to subsequent circuitry.

A suitable embodiment of the invention has been constructed and satisfactorily tested utilizing the following components, values, and potentials:

| | | |
|---|---|---|
| Tube **16** | | 5842 |
| Tube **37** | | 8071 |
| Diodes **23** and **45** | volt Zener | 12 |
| Capacitances **17, 22, 24, 29, 41, 44,** and **46** | mfd | .001 |
| Variable capacitances **19** and **28** | mmfd | .5 to 3 |
| Variable capacitance **34** | mmfd | 75 |
| Capacitance **38** | mfd | .01 |
| Resistance **18** | ohms | 390 |
| Resistances **25** and **47** | do | 100,000 |
| Resistances **26** and **48** | do | 100 |
| Resistance **32** | do | 56 |
| Resistance **35** | do | 548 |
| Resistance **42** | do | 820 |
| Variable resistance **43** | do | 2,000 |
| Bifilar wound coil **21** | microhenries | 1.9 |
| Inductance **31** | do | 1.55 |
| Inductance **33** | do | .42 |
| Inductance **39** | do | 2.7 |
| Coaxial cable **36** (characteristic impedance) | ohms | 95 |
| Potential sources **27** and **49** | volts D.C. | +150 |

It is to be understood that these particular components and values are presented only for illustrative purposes and are not intended to limit the scope of the invention in any way.

Considering the functional significance of the various components in the embodiment shown, variable resistance 43 is utilized to adjust the bias on the cathode electrode of tube 37 for controlling its operating point in order that its input impedance will properly terminate the cable 36. Variable inductance 39 is adjusted to establish resonance with the input capacitance. The winding of coil 21 which is coupled to capacitance 29, in conjunction with inductances 31 and 33 form a double-tuned network having a Q-ratio of four when the various values of components listed above are utilized. This double-tuned network provides the necessary matching termination impedance for the input end of cable 36. The input of this network is tuned by variable capacitance 28, and the output, by variable capacitance 34. The bifilar winding of coil 21 which is coupled to the grid electrode of tube 16, is cross-connected with respect to the other winding thereof in order to obtain an out-of-phase voltage to feed back via variable capacitance 19 for neutralizing the interelectrode grid-to-plate capacitance of tube 16. In the figure of drawing, resistance 35 represents an equivalent resistance introduced by necessary test circuitry in the embodiment constructed and tested, and resistance 32 is necessary to compensate for this equivalent resistance in order to maintain proper termination of the impedance of cable 36 at its input end. It is, therefore, to be understood that the invention may be practiced with the ohmic value of resistance 32 equal to zero and of resistance 35 equal to infinity, that is, both may be effectively removed from the circuit in some applications.

*Operation*

The operation of the invention will be considered in the environment in which it is most likely to be utilized. All circuitry to the left of cable 36 in the figure of drawing (tube 16 and associated circuitry) will be physically located on the same chassis as the preceding microwave mixer stage and conductor 13 will be coupled to the output terminal of that mixer stage; all circuitry to the right of cable 36 (tube 37 and associated circuitry) will be physically located on the same chassis as the IF postamplifier, remote from the mixer stage, with conductor 15 coupling the output of the invention to the input terminal of the postamplifier. Conductor 51 will be physically located on the postamplifier chassis for providing the necessary first pick-off signal from the invention, without the necessity of extending a cable to the mixer chassis as required by the prior art. Conductor 52 will provide the second pick-off signal from the first stage of the postamplifier.

The detected signal from the output of the mixer stage will be conveyed via conductor 13 and the coupling transformer of block 12 to tube 16. From the anode electrode of tube 16, the signal passes via coupling capacitance 29, inductance 31 and resistance 32 to a section of coaxial cable 36, which is terminated at either end in its characteristic impedance and the length of which is determined by the amount of physical separation desired between the mixer chassis and the postamplifier chassis in the initial construction of the radar receiver. Cable 36 conveys the signal to pick-off conductor 51, and via coupling capacitance 38 to the cathode electrode of tube 37. The signal passes from the anode of tube 37, through the coupling transformer of block 14 to the second pickoff conductor 52 and via conductor 15 to the first stage of the postamplifier.

Thus it becomes apparent from the foregoing description and annexed drawing that the invention, a novel two-section preamplifier circuit, is a useful and practical device having application in the field of electronics, particularly in the area of radar receiving equipment.

Obviously many modifications and variations in the selection of components and values for the present invention are possible in the light of the above teachings. It is therefore to be understood that, within the scope of the appended claims, the invention may be practiced otherwise than as specifically described.

I claim:

1. A preamplifier circuit for use in a radar receiver employing a logarithmic postamplifier circuit comprising:

a first triode vacuum tube having anode, grid, and cathode electrodes, said grid electrode being inductively coupled to a microwave mixer stage for receiving radar signal information therefrom, and said cathode electrode being coupled via an impedance means to ground potential;

first adjustable impedance matching means having input means coupled to said anode electrode of said first tube, having feedback means coupled to said grid electrode of said first tube for neutralizing the grid-to-plate capacitance thereof, and having output means for providing said radar signal information thereat;

a second triode vacuum tube having anode, grid, and cathode electrodes, said grid electrode being capacitively coupled to ground potential and said anode electrode being inductively coupled to said postamplifier circuit for providing said radar signal information thereto;

a first relatively lossless electrical coupling means having one end thereof coupled to said output means of said first adjustable impedance matching means and having the other end capacitively coupled to said cathode electrode of said second tube, for coupling said radar signal information from said first tube to said second tube;

second adjustable impedance matching means coupled between said cathode electrode of said second tube and ground potential in order to terminate said other end of said first coupling means in the proper impedance; and a second coupling means having one end thereof capacitively coupled to said cathode electrode of said second tube to provide a sample of said radar signal information to subsequent circuitry.

2. A preamplifier circuit for use in a radar receiver employing a logarithmic postamplifier circuit as set forth in claim 1 wherein:

said first adjustable impedance matching means includes an inductance-capacitance double-tuned network, and said feedback means therein comprises a variable capacitance in series with a bifilar-wound inductance.

3. A preamplifier circuit for use in a radar receiver employing a logarithmic postamplifier circuit as set forth in claim 2 wherein:

said first relatively lossless electrical coupling means comprises a length of coaxial cable; and said second adjustable impedance macthing means comprises a variable inductance in series with the parallel combination of a capacitance and a variable resistance.

References Cited

UNITED STATES PATENTS

| | | | |
|---|---|---|---|
| 2,360,475 | 10/1944 | Chatterjea et al. | 330—53 |
| 2,758,299 | 8/1956 | Byerly | 330—186 X |
| 3,240,874 | 3/1966 | Schreiner | 330—53 X |

FOREIGN PATENTS

| | | |
|---|---|---|
| 353,411 | 5/1961 | Switzerland. |

ROY LAKE, *Primary Examiner.*

NATHAN KAUFMAN, *Examiner.*